Sept. 16, 1924.
D. C. FUNCHEON
VEHICLE OPERATED GATE
Filed Sept. 4, 1923
1,508,546
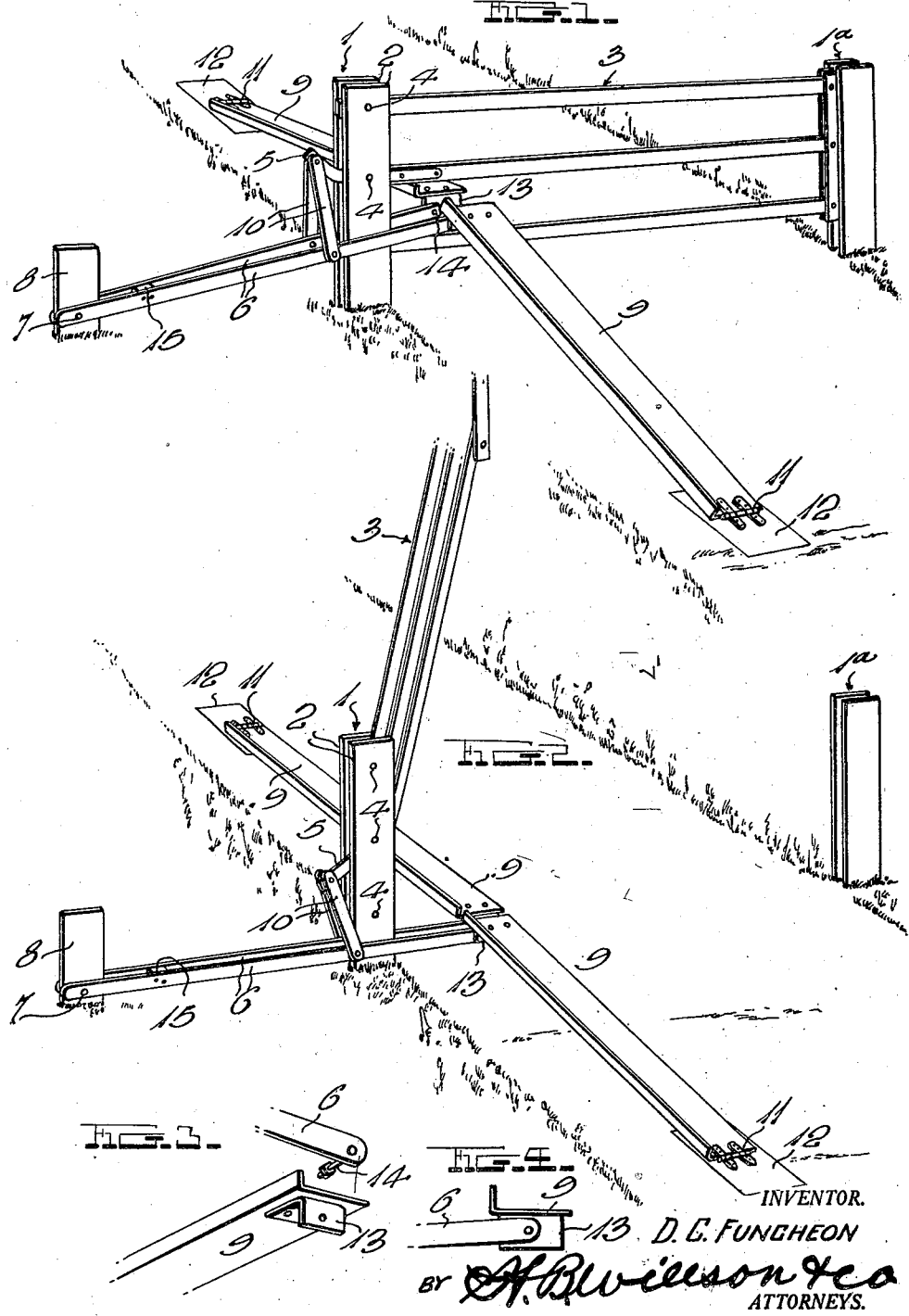
INVENTOR.
D. C. FUNCHEON
BY Wilson &co
ATTORNEYS.

Patented Sept. 16, 1924.

1,508,546

UNITED STATES PATENT OFFICE.

DANIEL C. FUNCHEON, OF DENVER, COLORADO.

VEHICLE-OPERATED GATE.

Application filed September 4, 1923. Serial No. 660,854.

*To all whom it may concern:*

Be it known that I, DANIEL C. FUNCHEON, a citizen of the United States, residing at Denver, in the county of Denver and State of Colorado, have invented certain new and useful Improvements in Vehicle-Operated Gates; and I do declare the following to be a full, clear, and exact description of the invention, such as will enable others skilled in the art to which it appertains to make and use the same.

My invention relates to improvements in gates which are automatically opened by the approach of a vehicle and it is the object of the invention to provide an exceptionally simple and inexpensive, yet an efficient and reliable device of this character, which is particularly adapted for opening by automobiles.

With the foregoing in view, the invention resides in the novel subject matter hereinafter described and claimed, the description being supplemented by the accompanying drawings.

Figures 1 and 2 are perspective views showing the gate closed and opened respectively.

Figure 3 is a detail perspective view showing the manner of connecting one of the operating levers with one of the depressible runways.

Figure 4 is an elevation of the parts shown in Fig. 3, showing them connected with each other, instead of in juxtaposition, as in Fig. 3.

In the drawings above briefly described, the numeral 1 designates a gate post which is preferably formed of two spaced planks 2. A gate 3, which is preferably of the form in which the vertical and horizontal bars have parallelogrammatic movement, is pivoted to the post 1, between the planks 2 thereof, as indicated at 4, so that said gate may swing vertically. When closed, the gate engages a suitable channeled post 1ª and is thus held against lateral movement.

The pivoted end of the gate 3 is provided with an arm 5 which extends rigidly therefrom to a point beyond the side of the post 1, remote from said gate. Under this arm, two levers 6 are provided, said levers straddling the post 1 and being pivoted at 7 to a post or the like 8 which is spaced outwardly from the aforesaid side of the post 1. From the pivot 7, the levers 6 incline to points at opposite sides of the gate 3 and at these points, they are connected to the upper ends of a pair of inclined wheel runways 9 which are disposed transversely with respect to the gate. The intermediate portions of the levers 6 are connected by links 10 or are otherwise operatively connected with the arm 5, so that depression of the runways 9, by the wheels of an automobile or other vehicle, will tilt the levers 6 downwardly, thus pulling upon the connections 10 and the arm 5, and swinging the gate 3 to the open position disclosed in Fig. 2. The gate is held in this position until the vehicle has passed entirely off of both runways, whereupon the gate closes again, by gravity.

In the preferred form of construction, the lower ends of the runways 9 are hinged at 11 to suitable rigid blocks or the like 12, and the upper ends of said runways are provided with metal angles 13 to which the levers 6 are loosely connected by bolts or the like 14. The pivotal connections between the links or the like 10, the arm 5 and the levers 6, are also rather loose to permit the necessary relative movement of parts, when said levers swing about the pivot 7 and the runways 9 swing on the hinges 11. During these movements, the levers 6 spring horizontally, as will be seen by comparing Figs. 1 and 2. If desired, these levers may be secured to opposite sides of a suitable spacer 15 which is located near the pivoted ends of said levers.

A gate constructed in substantially the manner herein disclosed, has proven to be very desirable, as it is self-opening and self-closing and does not therefore require that the driver of a machine or other vehicle, shall leave the latter to first open the gate and to then close it. On account of the proven advantages of the details disclosed, they are preferably followed, but within the scope of the invention as claimed, numerous minor changes may be made.

I claim:—

1. The combination with a gate post and a gate pivoted thereto for upward swinging; of an arm extending rigidly from the gate to a point beyond the side of the post remote from said gate, a pair of levers straddling said post and fulcrumed at a point spaced outwardly from the aforesaid side thereof, said levers inclining to points at opposite sides of the gate, a pair of depressible inclined wheel runways transverse to the gate and connected at their upper ends to the upper ends of said levers, and means operatively connecting said levers with the aforesaid arm.

2. In combination, a gate post and an upwardly swinging vertically collapsible gate pivoted thereto, an arm extending rigidly from the gate to a point beyond the side of the post remote from said gate, an anchoring post disposed at a point spaced outwardly from said gate post, a pair of levers pivotally connected at their outer ends to said anchoring post and inclining upwardly toward said gate post, the inner ends of said levers straddling said last named post and extending inwardly beyond it, links connected with the free end of the aforesaid arm and with the intermediate portions of said levers and a pair of depressible inclined runways extending at right angles from the gate on opposite sides thereof and pivotally anchored at their outer ends and pivotally connected at the inner ends with the corresponding ends of the aforesaid levers.

In testimony whereof I have hereunto affixed my signature.

DANIEL C. FUNCHEON.